Oct. 30, 1956 W. E. BROWN 2,768,535
CONTROL ROD POSITIONING MECHANISM
Filed Oct. 15, 1952
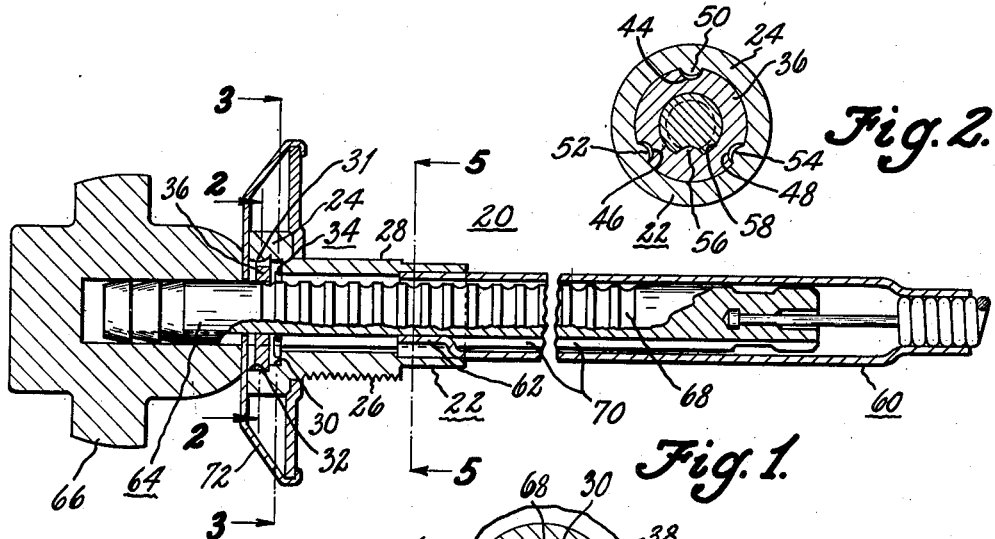
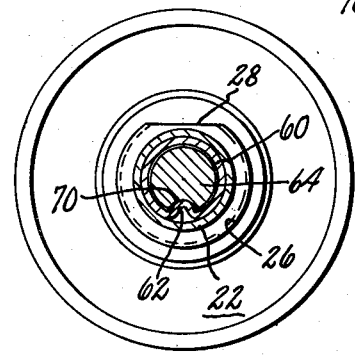
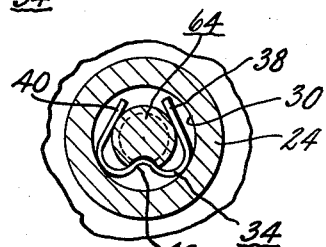
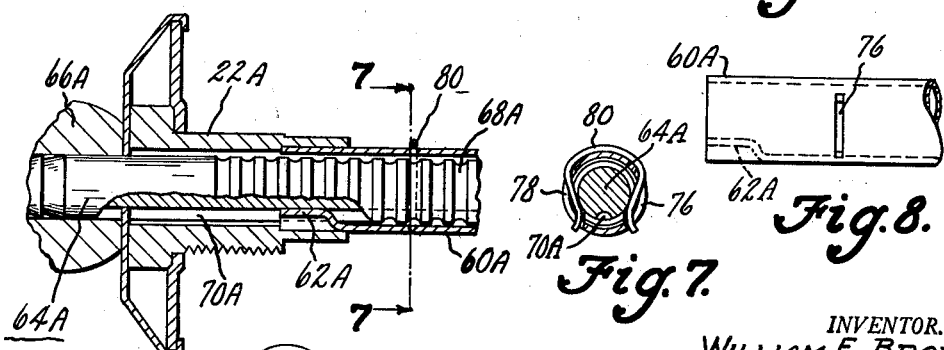
INVENTOR.
WILLIAM E. BROWN
BY
his ATTORNEYS United States Patent Office 2,768,535
Patented Oct. 30, 1956

2,768,535
CONTROL ROD POSITIONING MECHANISM

William E. Brown, Anderson, Ind., assignor to General Motors Corporation, Detroit, Mich., a corporation of Delaware Application October 15, 1952, Serial No. 314,929

4 Claims. (Cl. 74—503)

This invention relates to improvements in a controlling mechanism for choke heaters, valves and other remote controlled parts.

An object of the present invention is to provide a novel and improved friction detent device for yieldably holding one member in a predetermined position relative to another.

Another object is to provide a means whereby a support member may be held in a predetermined position relative to a reciprocating member. This object is accomplished by providing a longitudinal groove in the reciprocating member, which cooperatively engages one or more detent means on the support member thereby preventing relative rotation between the members; and providing a resilient spring clip means held in position by the support member, having a pair of extending arms adapted to cooperatively engage an annular groove on a reciprocating member thereby yieldably retaining the members in a predetermined axial position.

Another object of the present invention is to provide a rod provided with a knob or handle, and a spring clip means carried by another tubular support member, wherein the rod which is capable of longitudinal movement is restrained against rotative movement, and yieldably held in position against longitudinal movement by arms of said spring engaging annular grooves on said rod.

Another object of the present invention is to provide a resilient W-shaped spring carried by a support member, said spring having resilient arms adapted to engage an annular groove or grooves on the surface of a reciprocating member, and having an intermediate resilient portion adapted to engage a longitudinal groove on said reciprocating member whereby said spring in cooperation with a detent on a spring retaining washer and a detent formed on a tubular member attached to the support member will restrain the reciprocating member from rotative motion but yieldably hold the members to a predetermined axial position.

Further objects and advantages of the present invention will be apparent from the following description reference being had to the accompanying drawings wherein a preferred embodiment of the present invention is clearly shown.

In the drawings:

Fig. 1 is a sectional view of a controlling mechanism embodying the present invention.

Fig. 2 is a sectional view taken along line 2—2 of Fig. 1.

Fig. 3 is a sectional view taken along line 3—3 of Fig. 1 showing a resilient W-shaped spring with its arms forced apart.

Fig. 4 is a sectional view similar to Fig. 3, showing a W-shaped spring resting in an annular groove.

Fig. 5 is a sectional view taken along line 5—5 of Fig. 1.

Fig. 6 is a sectional view of a modification of the present invention.

Fig. 7 is a sectional view taken along line 7—7 of Fig. 6.

Fig. 8 shows a portion of the tubular member shown on the right in Fig. 6 and illustrates an integral detent formed on the internal portion of the tube and opposed slots in the surface of the tube.

Fig. 9 shows a spring adapted to fit in the slots as shown in Fig. 8.

Referring to the drawings, 20 designates a control mechanism adapted to be mounted in an instrument panel having an opening provided with a flat side in which an outer tubular supporting member or tubular fitting 22 is mounted. The fitting 22 is provided with an annular collar or flange 24 at the left end thereof as viewed in Fig. 1. The fitting 22 has external threads 26 adapted to receive a clamping nut not shown. The fitting 22 has a flat side 28 which will register with the flat side in the opening in the panel so that the fitting 22 cannot rotate relative to the instrument panel.

The tubular support 22 is formed with concentric bores 30 and 32 which are adapted to receive a W-shaped resilient spring 34 in bore 30 and a retaining washer 36 in the larger bore 32. The spring 34 shown in Figs. 3 and 4 preferably is made of .020 music wire formed so as to have two resilient extending arm portions designated as 38 and 40 and a resilient intermediate portion 42. The washer 36 has a plurality of external notches shown as 44, 46 and 48 adapted to receive projections 50, 52 and 54 on the periphery of the bore 32 to prevent relative rotation between the washer and support. The washer 36 also is provided with a projection 56 on the periphery of the central aperture 58.

Attached by some suitable means to the right end, as viewed on the drawing, of the tubular fitting 22 is a tubular housing 60. The housing 60 has a projection 62 on its inner surface. This projection 62, formed by some suitable means as depressing the end of housing 60, will be so located as to be in the same plane as the detent 56 formed in the retaining washer 36. A reciprocal rod or adjusting member 64 passing through the tubular housing 22 is provided with a grip or handle 66 at the left end thereof. The rod has an irregular surface or a plurality of annular grooves 68 and a flute or longitudinal groove 70. The rod 64 slides freely in the fitting 22, but when the rod is stationary the rod 64 is frictionally held from sliding by the clamping effect of the spring arms 38 and 40, which yield to pressure and may be spread apart as shown in Fig. 3. These arms 38 and 40 cooperatively engage annular grooves 68 of rod 64 and thereby yieldingly hold rod 64 against longitudinal movement relative to fitting 22. The longitudinal groove 70 of rod 64 also cooperatively engages the detent 62 in tubular housing 60 and the detent 56 in the spring retaining washer 36. The intermediate portion 42 of the spring 34 also engages the longitudinal groove 70 and holds the rod 64 against any vibrative movement in the fitting 22 and the tubular housing 60. The projections 62 and 56 in combination with the intermediate portion 42 of the spring conjunctively engage the groove 70 and restrain the rod 64 against rotative and vibrative movement relative to fitting 22.

The spring 34 and spring retaining washer 36 are held in assembled relation with the tubular support member 22 by any suitable means. In the present instance the outer periphery 31 of the concentric bore 32 in fitting 22 may be peened over and thereby retain washer 36 in the bore 32 against axial movement. A finishing apertured escutcheon plate 72 may be used to cover the bore opening 32 and further prevent axial movement of the washer.

One modification of the device, as shown in Fig. 6 of the drawings, embodies the use of a tubular member 22A having a reciprocating rod 64A slidable therein, The rod 64A has a handle or grip 66A mounted on the left end, a longitudinal groove 70A, and annular grooves 68A as seen in Fig. 6 of the drawings. A tubular housing 60A is suitably attached to the right end of fitting 22A. The housing 60A, as best shown in Fig. 8, has a projection 62A on its inner surface. A preferable method of forming this projection 62A is by indenting the outer surface of the tube. The housing 60A also has slots 76 and 78 in the tubular walls of the housing. These slots are cut on opposite sides of the tube so as to receive a spring clip 80, shown in Figure 9, in an assembled relation with the tube 60A and the rod 64A as shown in Fig. 7. The spring is formed with extending arms which are adapted to engage the annular grooves 68A of rod 64A and thereby yieldably position the rod against axial movement with reference to support 22A. The projection 62A in housing 60A is adapted to engage the longitudinal groove 70A in the rod 64A and prevent rotative movement of the rod with reference to support 64A.

The operation of the spring holding device is as follows: When the rod 64A is pushed or pulled in its wide range of movement the yieldable arms of the spring are spread apart. As each of the grooves 68 or 68A pass the arms of the spring, these arms engage the surface of the grooves and thereby axially position the rod. The rod is prevented against the rotative movement in each of the embodiments of our invention as shown. This objective is accomplished by having the longitudinal groove 70A of the rod 64A engage a projection 62 or 62A on the inner surface of the tubular housing 60 or 60A. In the device as shown in Fig. 1 a detent on the spring retaining washer engages the longitudinal groove so that the rod is prevented from rotative movement at two points. The intermediate portion of the spring also engages the groove and this portion of the spring may be of such form as to act as an anti-rattle device and prevent vibration between the rod and support.

While the form of the present invention as herein disclosed, constitutes a preferred form, it is to be understood that other forms might be adopted.

What is claimed is as follows:

1. A positioning device comprising in combination; an elongated tubular support having on one end an annular collar with a concentric shallow bore having longitudinal peripheral projections therein; a reciprocal rod extending through said elongated tubular support having an elongated longitudinal groove and at least one annular groove intermediate its ends; a tubular housing having one end received by the other end of the tubular support and a projection on an inner surface adapted to engage a longitudinal groove in said reciprocable rod, a W-shaped spring means carried in the concentric shallow bore of said collar, said W-shaped spring having outer arm portions adapted to engage an annular groove in said reciprocable rod and having its intermediate portion arranged to engage the longitudinal groove in said reciprocable rod whereby said W-shaped spring yieldably restrains said reciprocating rod from transverse and longitudinal movement, a retaining washer for said W-shaped spring, said retaining washer having external notches on the periphery thereof adapted to receive projections on the periphery of the concentric bore of said collar, said retaining washer having an aperture with a projection on its periphery adapted to receive the longitudinal groove in said rod for preventing rotation while permitting relative longitudinal movement therebetween, and an escutcheon plate adapted to engage a face of the collar of said elongated tubular support, said escutcheon plate being adapted to retain the W-shaped spring and retaining washer in the bore of said collar.

2. A positioning device comprising in combination; a tubular support, a W-shaped spring means carried by said tubular support, a spring retaining washer carried by the support, a projection on the periphery of the aperture of said retaining washer, said washer having means thereon to substantially prevent rotation of said washer relative to said tubular support, a projection on the inner surface of a tubular housing attached to said tubular support, a reciprocal rod extending through said tubular support, an elongated longitudinal groove in said rod adapted to engage projections on the washer and the tubular housing and the intermediate portion of the W-shaped resilient spring whereby said rod is substantially prevented from rotation and vibration relative to said support, and at least one annular groove on said rod yieldably engageable by the spring for yieldably positioning said rod longitudinally relative to the support.

3. A positioning device comprising in combination; an elongated tubular support having on one end an annular collar with a concentric shallow bore having longitudinal peripheral projections therein; a reciprocal rod extending through said elongated tubular support having an elongated longitudinal groove and at least one annular groove intermediate its ends; a W-shaped spring means carried in the concentric shallow bore of said collar, said W-shaped spring having outer arm portions adapted to engage an annular groove in said reciprocable rod and having its intermediate portion arranged to engage the longitudinal groove in said reciprocable rod whereby said W-shaped spring yieldably restrains said reciprocating rod from transverse and longitudinal movement; a retaining washer for said W-shaped spring, said retaining washer received in the bore in said collar and having external notches on the periphery thereof adapted to receive projections on the periphery of the concentric bore of said collar, said retaining washer having an aperture with a projection on its periphery adapted to receive the longitudinal groove in said rod for preventing rotation while permitting relative longitudinal movement therebetween and an escutcheon plate adapted to engage a face of the collar of said elongated tubular support, said escutcheon plate being adapted to retain the W-shaped spring and retaining washer in the bore of said collar.

4. A positioning device comprising in combination; a tubular support, a W-shaped spring means having a pair of spaced arms and a curved intermediate portion, said spring means being carried by said tubular support, a spring retaining washer carried by the support, a projection on the periphery of the aperture of said retaining washer, said washer having means thereon to substantially prevent rotation of said washer relative to said tubular support, a projection on the inner surface of a tubular housing attached to said tubular support, a reciprocal rod extending through said tubular support, an elongated longitudinal groove in said rod adapted to engage projections on the washer and the tubular housing and the intermediate portion of the W-shaped resilient spring whereby said rod is substantially prevented from rotation and vibration relative to said support, and at least one annular groove on said rod yieldably engageable by the arms of said spring for yieldably positioning said rod longitudinally relative to the support.

References Cited in the file of this patent

UNITED STATES PATENTS

| 1,339,811 | Dobrick | May 11, 1920 |
| 1,464,263 | Gardner | Aug. 7, 1923 |
| 1,813,286 | Gewalt | July 7, 1931 |
| 1,821,576 | Potter | Sept. 1, 1931 |
| 1,964,509 | Fina | June 26, 1934 |
| 2,256,696 | Weber | Sept. 23, 1941 |
| 2,592,361 | Weber | Apr. 8, 1952 |

FOREIGN PATENTS

| 729,722 | France | May 2, 1932 |
| 803,987 | France | July 20, 1936 |
| 825,932 | France | Dec. 27, 1937 |